United States Patent Office 2,896,054
Patented July 21, 1959

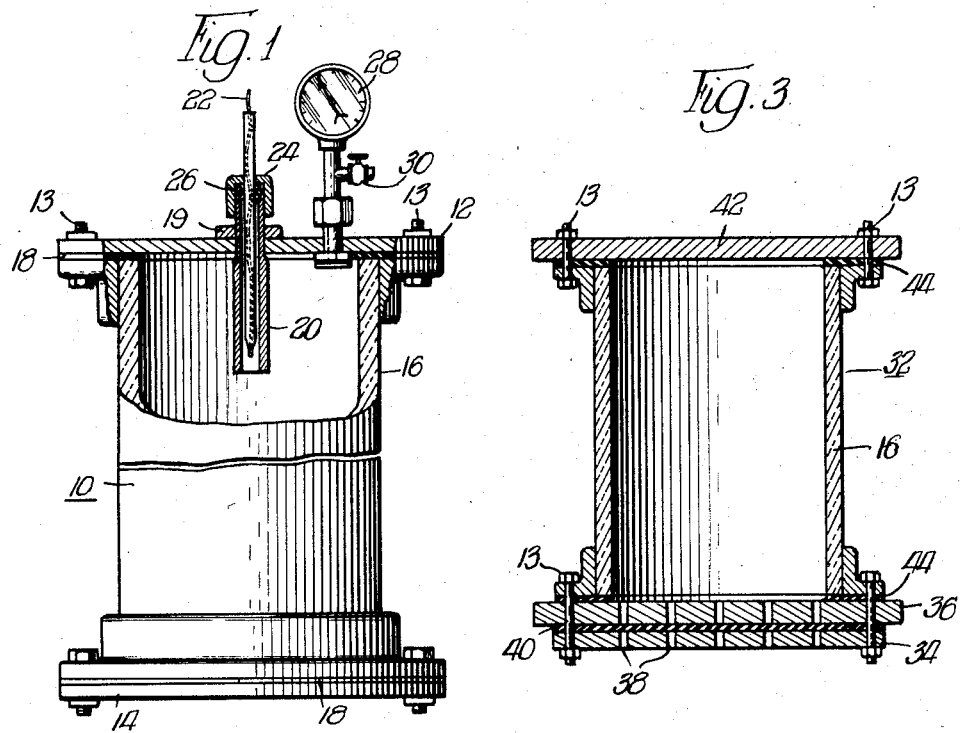
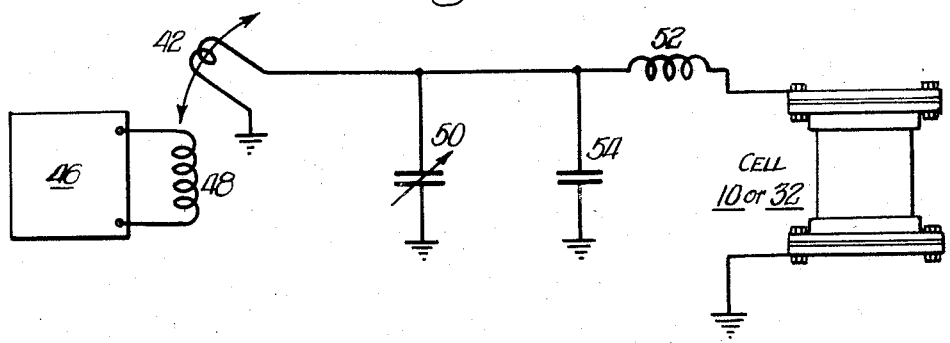

2,896,054

METHOD OF AND APPARATUS FOR THERMATRONIC HEATING

Ladislav J. Pircon, Berwyn, Ill., assignor to A. W. Brickman, Victor Conquest, Frank J. Madden, Wrisley B. Oleson, and Emery T. Filbey, all of Chicago, Ill., as trustees Application September 14, 1954, Serial No. 455,945

3 Claims. (Cl. 219—10.41)

The present invention is directed to a novel method of, and apparatus for thermally processing current-conducting organic materials electronically; and more particularly, to a method of, and apparatus for processing these materials in such manner as to increase the thermal energy thereof throughout its mass in a uniform manner.

The electrical thermal energy generating apparatus and processes utilized in the field today consist generally of dielectric heating and resistance heating arrangements. Dielectric heating processes, which depend upon high frequency currents to achieve energy conversion rather than heat transfer, are normally used to heat materials having a low thermal conductivity, and have proven particularly successful in rubber vulcanizing, and wood and plastic bonding applications. Resistance heating, on the other hand, which depends primarily on the passage of low frequency currents through the material to be heated, has been particularly successful in its use in the annealing of brass and bronze materials, the case hardening of steel, the preconditioning of metals prior to the hardening or forging thereof, and in various brazing and soldering processes.

The use of electronic thermal energy generating apparatus has resulted in the solution of many complicated manufacturing and production problems which previously existed in these fields, and constituted a definite step forward in the development of these arts. The more extensive use of this equipment in other fields, however, has been restricted somewhat by the limited application of the known processes and apparatus. That is, as a general rule, the use of any of the known dielectric or resistance heating processes in the generation of thermal energy within current-conducting organic materials, and especially of the ones of these materials which do not present a very high capacitive reactance, has proven unsuccessful.

Attempts to heat current-conductive organic materials with known dielectric heating apparatus and processes, for example, have resulted in direct short circuiting of the equipment, or at best, severe burning of the material. Alternatively, attempts to heat current-conducting organic materials with known resistance heating apparatus and processes resulted in a nonuniform distribution of the currents throughout the material, and accordingly, uneven heating of the mass. Experience has proven, therefore, that the use of known dielectric or resistance heating processes for the purpose of generating thermal energy within current-conducting organic materials is unsatisfactory, and accordingly, the applied scope of electronic heating has been heretofore seriously limited.

It is a particular object of this invention to provide a novel method of, and apparatus for, effecting the uniform generation of thermal energy within organic materials, and more particularly a method of, and apparatus for, uniformly increasing the thermal energy level within organic materials which do not have a very high capacitive reactance.

It has been found that the achievement of both molecular and ionic motion is essential to the accomplishment of the uniform generation of thermal energy within a current-conducting organic mass. Thus, the theory which underlies resistance and dielectric heating clearly indicates the reason for the inability of this method to successfully generate thermal energy within the current-conducting organic materials. That is, resistance heating is based upon the achievement of ionic or electronic motion, with an inconsequential amount of molecular motion. It is apparent therefrom that such arrangement will not effect uniform generation of thermal energy within organic material which requires the establishment of both molecular and ionic motion. Moreover, since dielectric heating basically consists of the achievement of molecular motion with limited ionic motion, it is apparent that dielectric heating is likewise incapable of successfully effecting the uniform generation of thermal energy within current-conducting organic material which requires both types of motion. It is a specific object of the present invention therefore, to provide a method of and apparatus for achieving both ionic and molecular motion in a current-conductive organic material. This novel manner of generating thermal energy within current-conducting organic material is referred to hereinafter as "thermatronic" heating.

The requirement for the achievement of both ionic and molecular motion in a current-conductive organic material is corroborated by actual tests, and as shown hereinafter, the lack of both of these motions in dielectric and resistance heating is basic to the failure of these methods in their application to current-conducting organic materials.

Briefly, in increasing the thermal energy level in materials such as wood, plastic, etc., by dielectric methods (which result primarily in the accomplishment of molecular motion), the inductive reactance of the material to be processed is normally negligible, whereas the capacitive reactance is of an extremely high value. Inasmuch as the impedance Z of a material is determined by $$Z=\sqrt{R^2+X^2}$$

wherein the value of X is determined by the difference between the values of the inductive and capacitive reactances, $(X=X_C-X_L)$; and since $X_C$ is normally high, and $X_L$ is negligible in dielectric materials, it is apparent that the impedance will be determined primarily by the value of $X_C$, and will be of a relatively high value.

It is therefore customary in the use of dielectric heating equipment to reduce the value of the capacitive reactance $X_C$. As is well known, $$X_C=\frac{1}{2\pi fC}$$

Thus, if the value of the capacitive reactance is to be reduced, every effort is made to raise the value of the frequency $f$ and/or the value of the capacitance $C$. The value of the capacitance, in such arrangements is basically determined by:

$$C=\frac{(8.85)(\text{dielectric constant } K)(\text{the surface area of the electrodes})(10^{-14})}{\text{the distance between electrodes}}$$

It is apparent from the foregoing that in raising the value of C (to reduce the value of $X_C$ in dielectric heating equipment, it is necessary to increase the area of the plates to its largest practical value, and to reduce the distance between the electrodes to its minimum possible value. In practice therefore, even the minor diameter of the electrode plates in dielectric heating arrangements is substantially greater than the distance between the electrodes.

It is well known however, that current-conducting organic materials, such as meat, have relatively low current resistance, and it is apparent (and experience has shown) that if dielectric heating equipment having these large electrode plates is used to raise the thermal energy level in current-conducting organic materials, the large area plates having a small thickness of current-conducting organic materials between them will result in the flow of excessive values of current which will effect burning of the material in extremely short periods, and in many instances, short circuiting of the source. It is apparent therefrom that a dielectric arrangement, which has as its primary objective the achievement of molecular flow, will not be successful in effecting the uniform increase of the thermal energy level in organic materials.

Likewise, resistance heating of nonmetallic materials which has ionic motion as its primary objective, will also be unsuccessful in effecting the uniform increase of the thermal level in current conducting organic materials. Briefly, it is well known that such organic materials offer a high resistance to free electron motion. Current conductivity through these organic materials is therefore dependent upon the achievement of ionic motion between the electrodes of the heating equipment, and uniform heating in turn, will be dependent upon uniform ionic flow. Since variable capacitive reactance does exist in these organic materials, the ionic flow and the resultant thermal energy conversion in the organic materials is not uniform, and the use of resistance heating will result in temperatures of extremely varied value at different points in the mass. Accordingly, pure resistance heating as applied to organic materials has also been proven to be unsuccessful.

According to the invention, there is set forth hereat a novel type of thermal energy generating process, which is specifically adapted to achieve ionic and molecular flow in current-conducting organic materials to thereby accomplish the uniform heating thereof.

In achieving a processing arrangement in which both ionic and molecular motion determine the amount of current conductivity, it is important that the processing arrangement be provided with a high frequency source for energizing electrodes which are in direct contact with the material, whereby molecular motion of an appreciable value is obtained. The capacitive reactace is thus minimized somewhat, and the resultant differences in capacitive reactance at various points in the organic material are also minimized to thereby assist in the accomplishment of a more uniform and homogeneous processing of the organic materials. Additionally, it is necessary to accomplish ionic motion in the organic material concurrently with achievement of the molecular motion as heretofore mentioned, and specifically to effect appreciable ionic motion without short circuiting the energizing source as the electrodes are energized.

According to one aspect of the invention, such arrangement is provided by utilizing electrodes which have at least their minor diameter which contacts the material of a value which is the same as or less than the distance between the electrodes. Tests have shown that such arrangement when energized by a high frequency source to heat current-conducting organic materials will effect both ionic and molecular motion, and consequently uniform heating of such materials.

The provision of such arrangement results in the solution of certain problems which have heretofore existed in the meat packing industry. That is, in the field today, hams are processed by several different well known pasteurization methods. Such methods produce a product which must be kept under constant refrigeration until used. In certain applications, as for example, military applications, the lack of refrigeration has made it impossible to supply such types of meat to men in certain military zones. In commercial applications, the refrigeration requirements frequently result in serious storage problems, and in many instances, seriously restrict or hamper the merchandising of these foods.

Various attempts to sterilize ham have been made heretofore. One of the processes attempted consisted of applying heat to the outside of a canned ham, and relying upon the heat transfer from the outside of the ham to the interior of the ham to effect sterilization of the product. Such methods have proven ineffective, the resulting products alternatively having an exterior portion which was overcooked, or an interior portion which was under-processed. Other methods which were attempted were likewise unsuccessful.

It is a specific object of the present invention to provide a method whereby the temperature of the meat is raised to a bacteria lethality value for a short period of time throughout the mass of the meat, whereby the bacteria is destroyed without affecting the physical structure of the meat, and the meat may be stored for an indefinite period of time without refrigeration.

It is a particular object of the invention to provide a commercially practical sterilization method for processing meats, and especially ham, in a comparatively short period of time, the heating arrangement of the invention requiring as little as eight to fifteen minutes, as compared to known processes which require eight to ten hours.

In actual applications thermatronic heating has been applied to the processing of organic materials, such as ground meat, and more specifically, ground pork luncheon meat containing the usual curing ingredients (sodium chloride, nitrates and/or nitrites, and sometimes sugar), such application having been set forth in more detail in my copending application which was filed by me on September 14, 1954, and received Serial No. 455,946, now Patent #2,807,698.

In another application of the invention, the process has been applied to comminuted meats on a continuous processing basis, as set forth in my copending application which was filed by me on September 14, 1954, and received Serial No. 455,907, now Patent 2,783,350.

In still another application of the novel thermatronic heating arrangement, it was found that organic materials, such as boned hams, may be heated uniformly throughout their mass, and such arrangement is set forth hereinafter in more detail. It is well known, of course, that these organic materials do have some capacitive reactance and are current conductive in nature.

The above and further objects, features and advantages of this invention are set forth in the following detailed description of the arrangement, and the accompanying drawings in which:

Figure 1 is a cross-sectional showing of a first processing cell;

Figure 2 is a schematic circuit illustration of the energizing source used to energize the processing cells in certain applications described herein; and Figure 3 is a cross-sectional showing of a second processing cell.

In one of the thermatronic processing arrangements, meat samples were placed for processing purposes in a processing cell 10 which was fabricated, as shown in Figure 1, by utilizing two ³⁄₁₆" steel plates 12, 14, which were fastened to the ends of a flanged borosilicate glass tube 16, 4" in diameter and 24" long, by bolts 13 in a conventional fashion. Rubber gaskets 18 were used between the steel and glass, and a piece of ½" plastic tubing 20 about 4" long threaded at one end was fitted through the center of plate 12. The threaded end of the plastic tubing 20 protruded about 1" above the upper steel plate 12, and was secured to the plate 12 by a locknut 19, the remaining portion being imbedded in the meat contained in the glass tube 16 between the plates 12, 14. The tube 20 provided a protective housing for a thermocouple probe 22 which was withdrawn into the plastic tube 20 during the period of generation, and pushed into the meat at 2" intervals immediately afterward to measure temperatures of the meat along the axis of the tube. A packing nut 24 filled with graphite string packing 26 acted as a pressure type seal along the sides of the thermocouple probe. A pressure gauge 28 was mounted at one side close to the glass wall. A support 30 for the gauge contained a tap-off just before the inlet to the pressure gauge, which consisted of a gate valve which could be opened for reducing the internal pressure of the cell. Allowance was made for the expansion of meat by cutting 1" holes through the meat longitudinally from top to bottom. In one test, a 13 pound meat sample was inserted in the tube, and a 15 kw. oscillator, having a 9 kv. voltage, and designed to operate at a frequency of 9 mc., was then connected to the electrodes for 4.83 minutes, the circuit being shown schematically in Figure 2. The following temperature distributions were found to exist along the axis of the tube of meat:

Temperatures at: °F.
2" ---------- 250
4" ---------- 252
6" ---------- 255
8" ---------- 252
10" ---------- 256
12" ---------- 245
14" ---------- 241
16" ---------- 244
18" ---------- 254
20" ---------- 255
22" ---------- [1] 260

[1] Average temperature 251° F.

In a second processing cell 32 utilized to process meat samples, an arrangement was provided wherein temperatures could be determined throughout the whole body of the meat. The form of the processing cell 32, as shown in Figure 3, was similar to that set forth in Figure 1, the length of the cell 32 in this case, however, being only 6" and the diameter of the tube being 4". The one end of the cell comprised two aluminum plates 34, 36, which had matching 1/8" holes 38 drilled across the diameter of the plates, and a piece of rubber sheeting 40 sandwiched between the plates 34, 36 thereby sealing the holes 38. A third plate 42 was used to seal the opposite end of the tube. The plates 34, 36 and 42 were fastened to the flanged glass tube 16 by bolts 13 as in the first cell 10, rubber gaskets 44 being used with the plates to effect a more perfect seal. It is apparent that in such arrangement the minor diameter of the portion of the end plates which contact the meat is in the order of 4", which is less than the 6" distance which existed between the end plates.

The thermocouple probe (not shown) comprised an asbestos wrapped constantan wire, which was pushed through a section of 1/8" steel tubing used for making hypodermic needles. The end of the tubing and the wire were soldered and pointed to form an iron constantan junction. As temperature readings were desired, the rubber sheeting 40 was pierced and the thermocouple probe injected into the meat. When it was withdrawn, the rubber sealed itself and prevented leakage. A temperature profile of the cross-section taken at a perpendicular to the longitudinal axis of the meat was obtained in this manner. A temperature traverse of this nature was taken at intervals along the axis with the arrangement shown in Figure 3, whereby a temperature description of the cross-section along the entire axis of the meat was obtained.

The one end of the processing cell, in each case, was inductively coupled to the tank circuit 48 of an oscillator 46, as shown in Figure 2. The second end of the cell and the second end of the pick-up coil were grounded. Provision was made on the oscillation 46 to change the amount of coupling between the pick-up coil 42 and the oscillator tank circuit coil 48. In an arrangement of this type, 2.5 kilowatts of power were sufficient to heat a meat sample contained in a cell which was 6" in length. Whole hams were heated in container arrangements which were 6" in diameter and 12" in length, the generators using 9.4 kilowatts of the 15 kilowatt capacity of the generator in such cases.

The system of Figure 2 was matched to the cells according to the following procedure:

$$C=\frac{1}{WR} \qquad \frac{R}{r}=1$$

$$L=\frac{r}{W} \qquad \frac{R}{r}=1$$

Wherein
$C=$ the capacity of the large and small condensers 50 and 54 combined,
$L=$ the inductance of the coil 52,
$W=2\pi f$,
$R=$ resistance presented to generator,
$r=$ resistance of meat.

Since the resistance of the meat changed with the temperature, it was necessary to have a small variable condenser 50 to maintain the proper balance during the cooking process.

In the above description, it is apparent that it would be necessary to vary both the inductance and capacitance to compensate for a change in meat resistance. The frequency of the oscillator is also somewhat affected by the load. However, the resistance presented to the generator varied over a sufficiently wide range to permit full power to be developed with adjustment in the capacitance alone, and with such arrangement, it is possible to develop the full rated output of the generator.

There has been set forth heretofore, a novel method and an apparatus for thermally processing current-conducting organic materials electronically, and specifically to a novel method of, and arrangement for, processing hams and other meat in such manner as to increase the thermal energy thereof throughout its mass in a uniform manner. Further, processing in this manner is achieved in a comparatively short period of time, and can be provided on an economically competitive basis with other known methods of processing current conducting organic materials.

While numerous changes, modifications and substitutions of equivalent materials and design may be resorted to in practising my invention, it is nevertheless believed that such variations will not necessarily depart from the scope of the invention involved, and it is not the intention that the invention be limited to the particular features formed and embodiments illustrated and described.

What is claimed is:

1. The method of raising the thermal energy level in an optimum manner in current-conducting organic materials uniformly throughout its mass which comprises the steps of placing between a pair of electrodes, and in direct contact therewith, an amount of current-conducting organic material which is sufficient to cause the electrodes to be spaced at a distance which is greater than the minor diameter of the electrodes, and applying a current to said electrodes of a frequency sufficiently high to insure passage of said current through said material without depending entirely upon the conductivity of said material, thereby achieve ionic and molecular motion in the material.

2. An optimum arrangement for raising the thermal energy level in current-conducting organic materials uniformly throughout its mass comprising a pair of electrodes, means for spacing the electrodes at a distance which is greater than the minor diameter of the electrodes, a source for energizing same with a current having a frequency sufficiently high to insure passage of the current through said mass without depending entirely upon the conductivity of said mass, and means for positioning the organic material in direct contact with said electrodes.

3. The method of raising the thermal energy level uniformly throughout current-conductive organic materials which comprises placing the material in direct contact wtih and between a pair of electrodes spaced a distance greater than their lines of contact with the material, and passing high frequency electrical energy between said electrodes and through the said material to effect combined resistance and dielectric heating of the material with the occurrance of both molecular and substantial ionic motion concurrently therewithin.

References Cited in the file of this patent

UNITED STATES PATENTS

| | | |
|---|---|---|
| 2,468,263 | Joy | Apr. 26, 1949 |
| 2,473,041 | Urbain | June 14, 1949 |
| 2,489,135 | Himmel et al. | Nov. 22, 1949 |
| 2,508,382 | Gard | May 23, 1950 |
| 2,515,211 | Gard | July 18, 1950 |
| 2,604,665 | Bosomworth et al. | July 29, 1952 |
| 2,608,638 | Daiger | Aug. 26, 1952 |
| 2,723,517 | Mittelmann | Nov. 15, 1955 |

FOREIGN PATENTS

| | | |
|---|---|---|
| 599,935 | Great Britain | Mar. 24, 1948 |
| 883,870 | France | July 22, 1943 |

OTHER REFERENCES

Radio-Frequency Heating, by Leslie Hartshorn, George Allen & Unwin Ltd., publisher, 1949, pages 174, 175 and 213–216.